United States Patent [19]

Matsuura et al.

[11] Patent Number: 4,471,992
[45] Date of Patent: Sep. 18, 1984

[54] AUTOMOBILE BODY STRUCTURE

[75] Inventors: Osamu Matsuura; Nobuhiro Komatsu, both of Hiroshima, Japan

[73] Assignee: Toyo Kogyo Co., Ltd., Hiroshima, Japan

[21] Appl. No.: 435,740

[22] Filed: Oct. 21, 1982

[30] Foreign Application Priority Data

Oct. 23, 1981 [JP] Japan .............................. 56-157844[U]

[51] Int. Cl.³ .............................................. B62D 27/02
[52] U.S. Cl. .................... 296/209; 296/195; 296/198; 296/201
[58] Field of Search .............. 296/185, 187, 188, 191, 296/193, 195, 197, 198, 201, 209 D

[56] References Cited

U.S. PATENT DOCUMENTS

| 2,474,992 | 7/1949 | Stephenson | 296/195 |
| 3,423,122 | 1/1969 | Wessells | 296/185 |
| 3,528,699 | 9/1970 | Wessells | 296/209 |
| 4,252,364 | 2/1981 | Toyama | 296/185 |

FOREIGN PATENT DOCUMENTS

| 15213 | 7/1978 | Japan . |
| 29011 | 8/1978 | Japan . |
| 9973 | 7/1981 | Japan . |

Primary Examiner—Robert R. Song
Attorney, Agent, or Firm—Gerald J. Ferguson, Jr.; Joseph J. Baker

[57] ABSTRACT

An automobile body structure has a side sill formed of inner and outer panels, a central pillar joined to the side sill to extend upwardly therefrom, a rear fender panel extending upwardly from the outer panel of the side sill to form the edge of a door opening and rearwardly of this edge to form a body panel, and a reinforcement extending rearwardly together with the inner panel of the side sill to form a closed cross-section therebetween and joined at its rear end to the rear wheelhouse. The structure greatly improves the body strength rearward of the center pillar.

6 Claims, 9 Drawing Figures

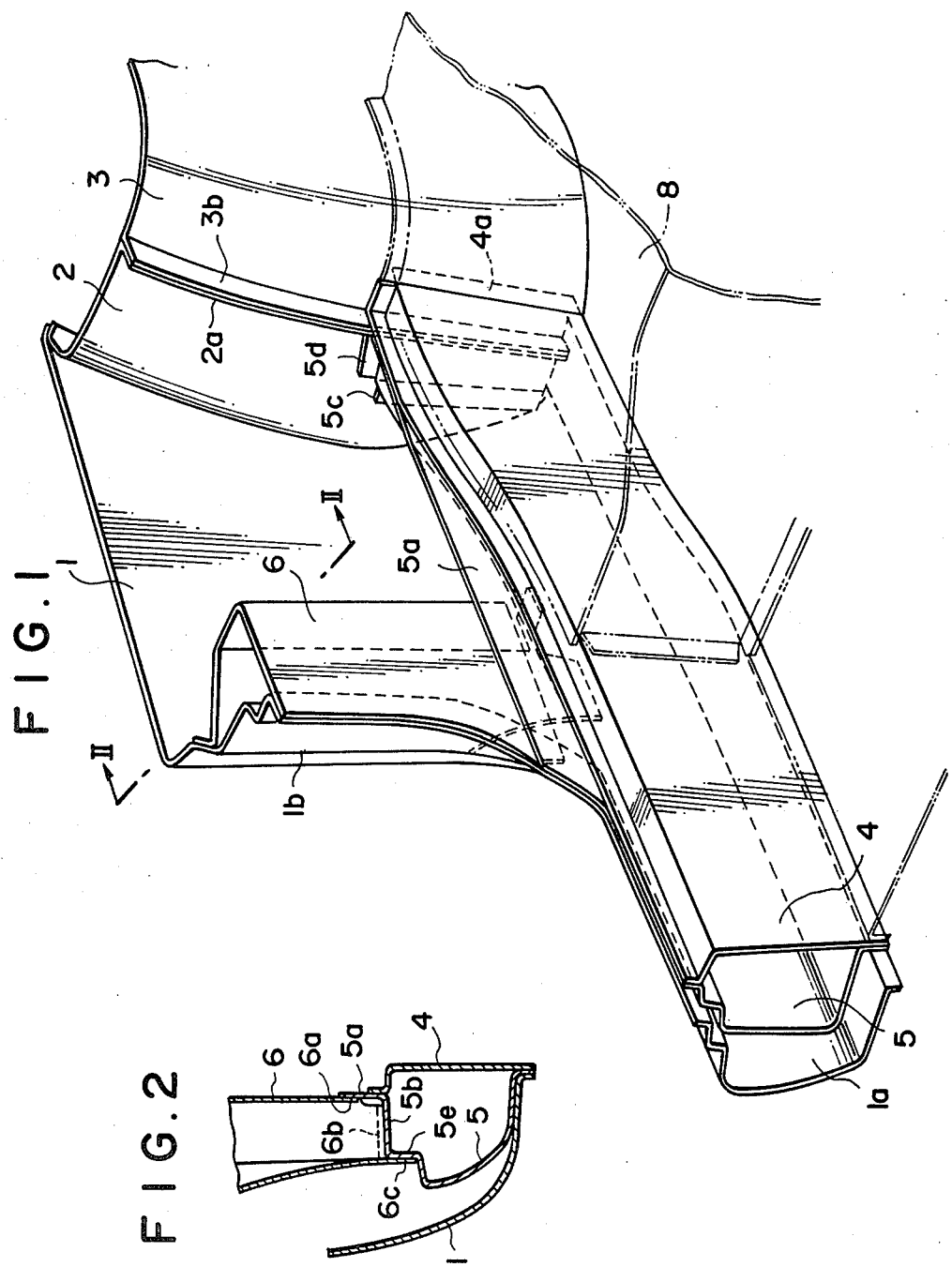

AUTOMOBILE BODY STRUCTURE

BACKGROUND OF THE INVENTION

1. Field of the Invention

This invention relates to an automobile body structure, and more particularly to the structure of the body of a two-door type automobile rearward of the joint between the side sill and the center pillar.

2. Description of the Prior Art

The rearward part of the body of a conventional two-door automobile is constructed as, for example, is disclosed in Japanese Unexamined Utility Model Publication No. 56(1981)-9973, in such a manner that a side sill formed of an outer panel and an inner panel so as to have a closed cross-section runs along the lower side portion on either side of the vehicle body. The rear portion of the outer panel of the sill is raised upwardly to form the edge of the door opening and is also extended rearwardly to form the rear fender. On the other hand, the inner panel of the side sill extends rearwardly beyond the raised portion of the outer panel to have its rear extremity joined with the rear wheelhouse. The inner panel of the body is provided above the inner panel of the side sill.

Because of this construction, there remains a large void defined by the inner panel of the body, the inner panel of the side sill and the rear fender and as this portion is not provided with a reinforcing member having a closed cross-section, it lacks strength and has posed a problem since it is apt to be badly deformed at the time of a collision or the like.

With the aim of improving the strength of the body structure it has been proposed to provide a separate panel inward of the raised portion of the outer panel of the side sill, this separate panel being joined to the inner pannel of the body to form a closed cross-section and being extended upwardly from the side sill as a center pillar. In addition to this it has also been proposed to reinforce the joint between this center pillar and the side sill in accordance with the methods set forth in Japanese Unexamined Utility Model Publication Nos. 53(1978)-15213 and 53(1978)-29011. In all of the proposed structures, however, the reinforcing member with closed cross-section provided at the lower side portion of the body to run in the longitudinal direction of the vehicle, i.e. the side sill, is discontinued at the joint with the center pillar so that there is no closed reinforcing member present at the lower side of the body rearward of this joint. Thus these structures do not fully overcome the aforesaid defects of the conventional structure.

SUMMARY OF THE INVENTION

The first object of this invention is to provide an automobile structure in which the body rearward of the center pillar is reinforced by means of an extremely simple structure.

The second object of this invention is to provide an automobile structure in which the portion of the interior panel of the body conventionally provided inwardly of the rear fender is eliminated thereby making it possible to utilize the space that heretofore existed between the inner panel of the body and the rear fender for the rear part of the passenger cabin.

In accordance with the body structure provided by the present invention the reinforcement used to strengthen the joint between the side sill and the center pillar in the conventional two-door type automobile is extended rearwardly along with the inner panel of the side sill as far as the rear wheelhouse, whereby the strength of the structure between the center pillar and the rear wheelhouse is increased.

The structure thus gives the region of the body between the center pillar and the rear wheelhouse excellent protection against deformation even at the time of a rear-end collision or a strong impact from the side, thereby greatly increasing the strength of the vehicle against collision.

Moreover, as the structure for realizing this increase in body strength can be obtained simply by rearwardly extending the reinforcement conventionally provided to increase the joint strength between the center pillar and the side sill, it is highly advantageous both in terms of production process and cost. It consequently has high practical utility.

Moreover, the structure according to this invention makes it possible to eliminate the inner body panel which has conventionally been provided inwardly of the rear fender so that the rear portion of the passenger cabin can be enlarged by extending it as far as the fender panel. Even where trim is provided inwardly of the rear fender panel, it is still possible to realize a substantial enlargement of the rear portion of the passenger cabin by, for example, bulging the trim outwardly or providing a large pocket within the trim. This is especially advantageous in the case of small vehicles in which it is hard to secure adequate passenger cabin space.

BRIEF DESCRIPTION OF THE DRAWINGS

FIG. 1 is a perspective view of a first embodiment of the body structure of an automobile in accordance with this invention, FIG. 2 is a vertical sectional view of the center pillar shown in FIG. 1 taken along line II—II.

DESCRIPTION OF THE PREFERRED EMBODIMENTS

Figure 3:
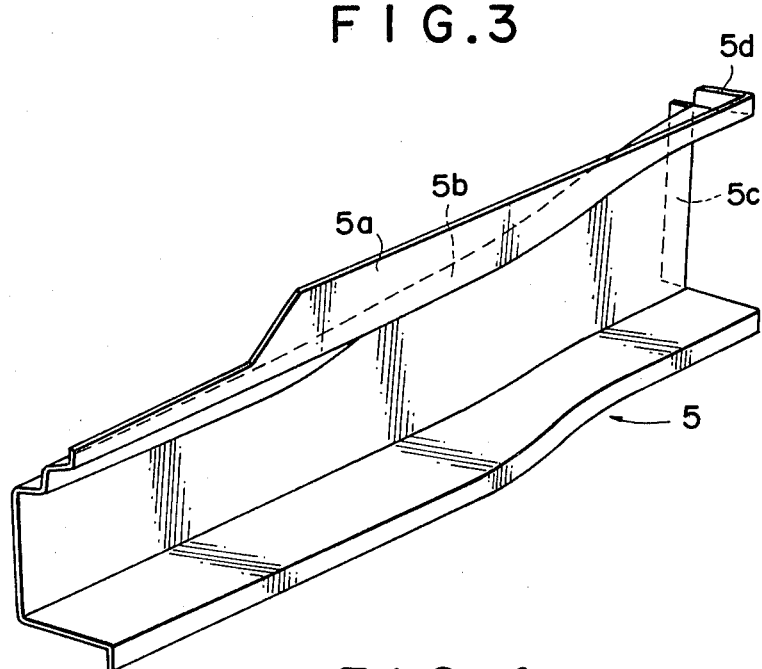
FIG. 3 is a perspective view of the reinforcement used in the first embodiment.

Reffering first to FIG. 1, a fender panel 1 has its rear end joined to an outer panel 2 of a rear wheelhouse, the lower part of its front end continues into an outer panel 1a of a side sill, and the upper part of its front end continue into the outer panel 1b of a center pillar, the outer panel 1b rising above the outer panel 1a of the side sill to form the edge of a door opening. The outer panel 1a of the side sill and the outer panel 1b of the center pillar are respectively provided on their inner sides with a side sill inner panel 4 and a center pillar inner panel 6 in face-to-face relationship so as to form closed cross-sections. Between the side sill outer panel 1a and the side sill inner panel 4 is provided a reinforcement 5 which, together with the side sill inner panel 4, forms a closed cross-section. The upper edge of the reinforcement 5 is joined to the inner panel 6 of the center pillar. As can be seen from FIGS. 2, 3 and 4, the reinforcement 5 has an upright portion 5a that is welded to the lower end portion 6a of the inner wall of the center pillar inner panel 6, an upper wall 5b that is welded to a bent portion 6b at the lower end of the back wall of the center pillar inner panel 6, and an outer wall 5e formed continuously with the upper wall 5b to which the lower end 6c of the outer wall of the center pillar 6 is welded (FIG. 2). Welded in this manner, the reinforcement 5 is firmly held in place.

Figure 4:
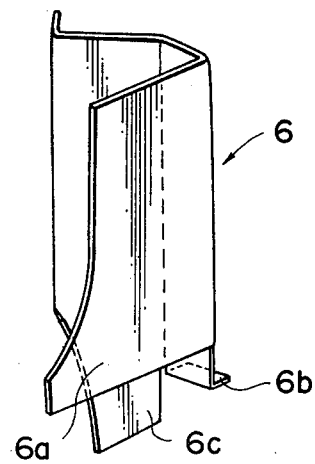
FIG. 4 is a perspective view of the inner panel of the center pillar of the same embodiment.
Figure 5:
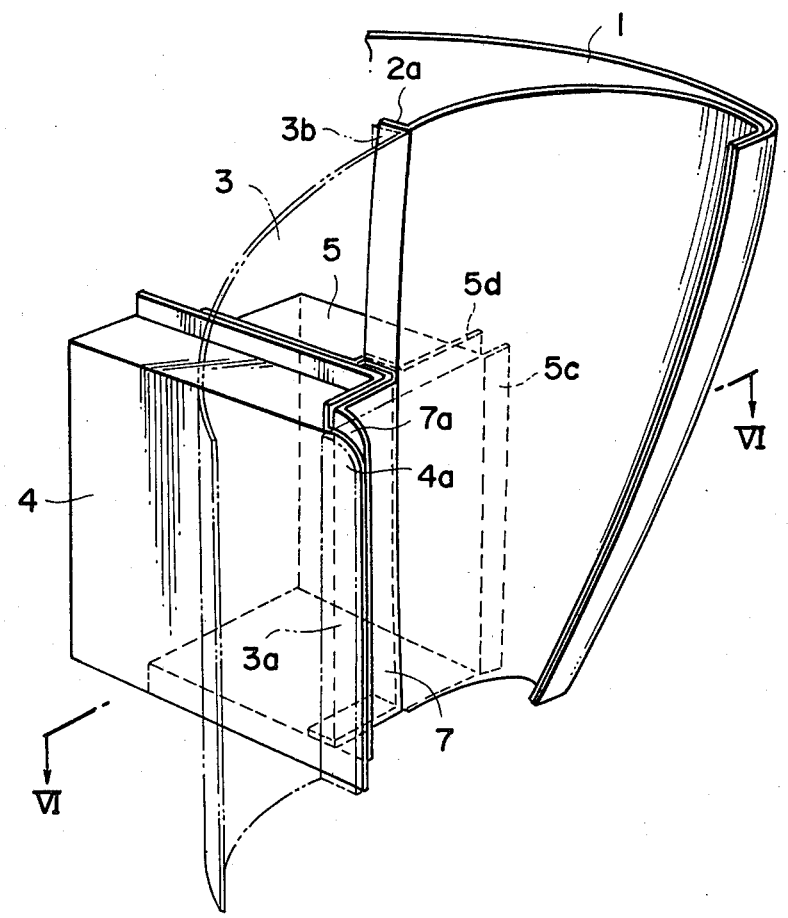
FIG. 5 is a perspective view of the joint portion with the rear wheelhouse.

As is clear from FIGS. 1, 3 and 5, the reinforcement 5 extends rearward from the central pillar joint portion to the outer and inner panels 2, 3 of the rear wheelhouse and is welded to the rear fender outer panel 2 at the bent portions 5c, 5d provided at its rear end.

Figure 6:
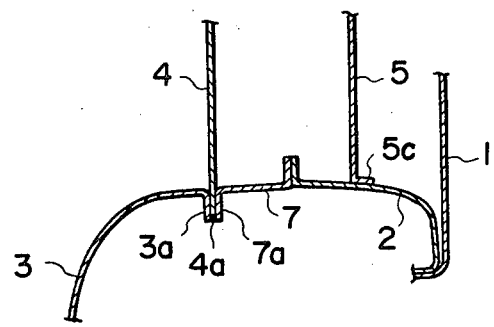
FIG. 6 is a cross-sectional view of the joint portion with the rear wheelhouse taken along the line VI—VI in FIG. 5.
Figure 7:
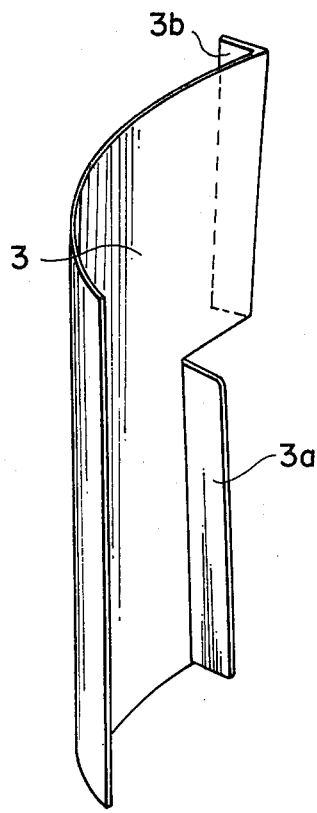
FIG. 7 is a perspective view of the inner member of the wheelhouse in the same embodiment.
Figure 8:
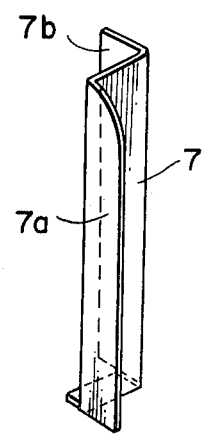
FIG. 8 is a perspective view of a closing member used in the same embodiment.

The outer panel 2 and the inner panel 3 of the rear wheelhouse are provided with forwardly projecting bent portions 2a and 3b which are welded together in the region above the weld between the side sill inner panel 4 and the reinforcement 5. The rear end 4a of the side sill inner panel 4 is welded to the front face of the inner panel 3 of the wheelhouse. As can be seen from FIGS. 5 and 6, the rear end 4a extending back from the side sill inner panel 4 is inserted into the wheelhouse through a cutaway (FIG. 7) and is welded to a rearwardly bent portion 3a of the inner panel 3 of the wheelhouse. The cutaway is closed by a closing member 7 fixed therein (FIG. 8). More specifically, the closing member 7 has rearwardly bent portion 7a that is welded to the rear end 4a of the inner panel 4 of the side sill and a forwardly bent portion 7b that is welded to the forwardly bent portion 2a of the outer panel 2 of the wheelhouse.

The numeral 8 denotes a floor panel joined to the side sill inner panel 4 and the inner panel 3 of the wheelhouse.

Altough the structure involves a number of other welds such as between the side sill and the bottom of the reinforcement or at the joint between the inner and outer panels of the wheelhouse, no detailed description of these will be given here as they are easily understood from the drawings alone.

Next a brief explanation will be made of the manner of assembly of an automobile body in accordance with the above described embodiment.

First an underbody structure is formed by joining the side sill inner panel 4, the wheelhouse inner panel 3 and the floor panel 8. At this time, the rear end 4a of the side sill inner panel 4 is inserted into the cutaway in the wheelhouse and is welded to the rearwardly bent portion 3a formed by notching and bending the inner panel 3.

Next the reinforcement 5 is joined to the lower end of this center pillar inner panel 6. Then the rear end of the reinforcement 5 is joined to the wheelhouse outer panel 2 and the fender panel 1 is joined to these two members to obtain a subassembly. The closing member 7 is attached to this subassembly by welding its bent portion 7b to the forwardly bent portion 2a of the wheelhouse outer panel 2.

Next the subassembly is welded to the aforesaid underbody structure. At this time, the wheelhouse outer panel 2 and the wheelhouse inner panel 3 are joined in the region above the region of contact with the reinforcement 5 and the side sill inner panel 4 by welding together their forwardly bent portions 2a and 3b. In the region where the reinforcement 5 and the side sill inner panel 4 are joined to the rear wheelhouse, the closing member 7 is attached by welding of its bent portion 7a to the joint formed between the bent portion 3a of the wheelhouse inner panel 3 and the rear end 4a of the side sill inner panel 4 so as to project into the wheelhouse. Then the subassembly is joined to the side sill inner panel 4 by welding at the regions of contact at the upper and lower edges thereof.

Figure 9:
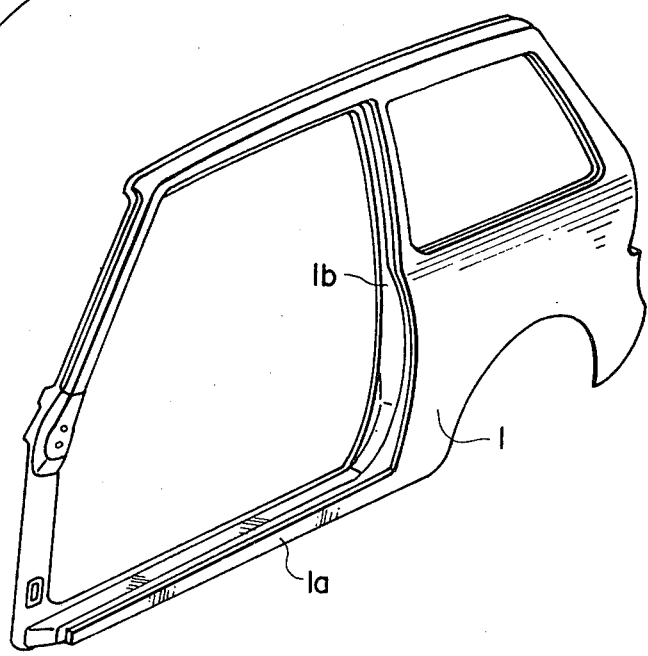
FIG. 9 is a perspective view showing the overall external appearance of the side of an automobile body incorporating the structure according to this invention.

An overall view of the side of an automobile body assembled in the manner outlined above is shown in FIG. 9.

As is clear from the above description, since in accordance with the present invention the reinforcement 5 is provided to extend as far as the rear wheelhouse and is firmly joined to the inner panel 4 of the side sill so as to form a closed cross-section, the strength of the body structure rearward of the center pillar is greatly increased.

We claim:

1. An automobile body structure comprising a side sill formed of an inner panel and an outer panel to have a closed cross-section and provided to extend along the lower portion of either side of the body in the longitudinal direction thereof, a center pillar formed to have a closed cross-section and joined to the side sill to extend upwardly therefrom, a rear fender panel extending upwardly from the outer panel of the side sill as a continuation thereof to form the edge of a door opening and rearwardly of this edge to from a body panel, and a reinforcement extending rearwardly together with the inner panel of the side sill to the rear wheelhouse to form a closed cross-section therebetween and joined at its rear end to the front face of a panel of the rear wheelhouse, the part of said rear fender panel which forms the edge of a door opening constituting an outer panel of the center pillar and an inner panel of the center pillar being provided in conjunction with the outer panel to give the center pillar a closed cross-section, said rear wheelhouse being constituted of an inner panel and an outer panel, the rear end of the inner panel of the side sill being joined to the inner panel of the wheelhouse and the rear end of said reinforcement being joined to the outer panel of the wheelhouse, said center pillar being constituted of at least an inner wall and a rear wall, the lower end of said walls being fixed being joined to the reinforcement.

2. An automobile body structure according to claim 1 wherein the inner panel of the center pillar is formed of an inner wall, a rear wall and an outer wall the lower end of each of which is joined to the reinforcement.

3. An automobile body structure according to claim 2 wherein the portion of the reinforcement joined to the inner panel of the center pillar has an upper wall, an upright portion formed by bending the inner edge of the upper wall upwardly and an outer wall formed by bending the outer edge of the upper wall downwardly, the lower ends of the rear wall, inner wall and outer wall of the inner panel of the center pillar being joined respectively to the upper wall, upright portion and the outer wall of the reinforcement.

4. An automobile body structure according to claim 2 wherein the reinforcement has a bent portion formed at the rear end thereof being in abutment with and joined to the front face of the outer panel of the wheelhouse, and the rear end of the side sill inner panel is inserted into the wheelhouse through a cutaway formed by cutting and rearwardly bending a part of the inner panel of the wheelhouse and is joined to rearwardly bent portion of the inner panel of the wheelhouse.

5. An automobile body structure according to claim 4 wherein the outer panel of the wheelhouse is provided with a closing member for closing the cutaway, the closing member having a forwardly bent portion joined to a forwardly bent portion of the outer panel of the wheelhouse and a rearwardly bent portion joined to the rearwardly bent portion of the inner panel of the wheelhouse which is joined to the rear end of the side sill inner panel.

6. An automobile body structure as in claim 1 where the body structure is of the two-door type.

* * * * *

UNITED STATES PATENT AND TRADEMARK OFFICE
CERTIFICATE OF CORRECTION

PATENT NO. : 4,471,992

DATED : September 18, 1984

INVENTOR(S) : Osamu MATSUURA, et al.

It is certified that error appears in the above-identified patent and that said Letters Patent is hereby corrected as shown below:

In the heading of the patent, [73] Assignee:, delete "Toyo Kogyo Co., Ltd." and insert therefor -- Mazda Motor Corporation -- .

Signed and Sealed this

Twenty-third Day of April 1985

[SEAL]

Attest:

DONALD J. QUIGG

Attesting Officer

Acting Commissioner of Patents and Trademarks